ns(12) United States Patent
Hovanky

(10) Patent No.: US 7,113,351 B2
(45) Date of Patent: Sep. 26, 2006

(54) SYSTEMS AND METHODS FOR ACTUATING LENS ASSEMBLIES

(75) Inventor: Thao D. Hovanky, Austin, TX (US)

(73) Assignee: CoVi Technologies, Inc., Austin, TX (US)

( * ) Notice: Subject to any disclaimer, the term of this patent is extended or adjusted under 35 U.S.C. 154(b) by 0 days.

(21) Appl. No.: 10/732,740

(22) Filed: Dec. 10, 2003

(65) Prior Publication Data

US 2004/0174614 A1    Sep. 9, 2004

Related U.S. Application Data

(60) Provisional application No. 60/437,710, filed on Jan. 2, 2003.

(51) Int. Cl.
*G02B 7/02* (2006.01)
*G02B 15/14* (2006.01)
*G11B 7/00* (2006.01)

(52) U.S. Cl. ............ 359/824; 359/814; 359/823; 359/696; 369/44.16; 369/86

(58) Field of Classification Search ........ 359/694–698, 359/822–824, 813, 814
See application file for complete search history.

(56) References Cited

U.S. PATENT DOCUMENTS

| | | | |
|---|---|---|---|
| 3,958,257 A | 5/1976 | Johnson | |
| 3,972,056 A | 7/1976 | Tsujimoto et al. | |
| 4,192,591 A | 3/1980 | Yobaccio | |
| 4,386,823 A * | 6/1983 | Musha | 369/44.11 |
| 4,404,595 A | 9/1983 | Ushiro et al. | |
| 4,482,986 A * | 11/1984 | Noda et al. | 369/44.16 |
| 4,658,390 A * | 4/1987 | Fujii et al. | 369/44.16 |
| 4,845,411 A | 7/1989 | Smith | |
| 4,885,600 A | 12/1989 | Iwasa et al. | |
| 5,016,993 A | 5/1991 | Akitake | |
| 5,034,837 A | 7/1991 | Schmitz | 360/256.2 |
| 5,060,001 A | 10/1991 | Kaneda | |
| 5,144,491 A | 9/1992 | Ushiro et al. | |
| 5,191,470 A | 3/1993 | Wickholm et al. | |
| 5,200,776 A * | 4/1993 | Sakamoto | 396/86 |
| 5,289,318 A * | 2/1994 | Sekine et al. | 359/813 |
| 5,352,882 A | 10/1994 | Koyanagi et al. | |
| 5,387,936 A | 2/1995 | Katsumoto | |
| 5,396,367 A | 3/1995 | Ono et al. | |
| 5,737,644 A | 4/1998 | Nomura et al. | |
| 5,748,995 A | 5/1998 | Kitagawa et al. | |
| 5,838,374 A | 11/1998 | Kikuchi | |
| 5,943,169 A * | 8/1999 | Okada | 359/557 |
| 5,986,821 A | 11/1999 | Yoon | |
| 5,995,299 A | 11/1999 | Yoon | |

(Continued)

FOREIGN PATENT DOCUMENTS

JP    10186203 A  *  7/1998

(Continued)

OTHER PUBLICATIONS

Copending U.S. Appl. No. 10/732,193, filed Dec. 10, 2003, "Optical Block Assembly" (COV1:006).

(Continued)

*Primary Examiner*—Loha Ben
(74) *Attorney, Agent, or Firm*—O'Keefe, Egan & Peterman, LLP

(57) ABSTRACT

Systems and methods for actuating lens assemblies (e.g., for purposes of zoom and/or focus lens operations) that may be implemented, for example, in any camera lens or other lens application that employs one or more actuatable lenses.

96 Claims, 9 Drawing Sheets

U.S. PATENT DOCUMENTS

| | | | |
|---|---|---|---|
| 6,011,659 | A | 1/2000 | Onda |
| 6,172,709 | B1 | 1/2001 | Yamano et al. |
| 6,178,156 | B1 * | 1/2001 | Kuwajima et al. .......... 720/694 |
| 6,322,258 | B1 | 11/2001 | Ryan et al. |
| 6,498,564 | B1 | 12/2002 | Oda |
| 6,507,366 | B1 | 1/2003 | Lee |
| 6,563,648 | B1 | 5/2003 | Gleckman et al. |
| 6,747,686 | B1 | 6/2004 | Bennett |
| 6,856,469 | B1 * | 2/2005 | Yoneyama et al. ......... 359/696 |
| 2002/0014577 | A1 | 2/2002 | Ulrich et al. |

FOREIGN PATENT DOCUMENTS

JP          2000321475 A   *  11/2000

OTHER PUBLICATIONS

Ferro Tec USA, Domain Detection, http:/www.ferrotec.com/usa/domain_detection.htm, 2 pgs., printed off Internet on Dec. 5, 2003, and labeled "© 2001-2003".

Ferro Tec USA, Ferrofluid Technology Overview, http:/www.ferrotec.com/usa/ferrofluid_technology_overview, 3 pgs., printed off Internet on Dec. 5, 2003, and labeled "© 2001-2003".

Ferro Tec USA, Optical Pick Ups, http:/www.ferrotec.com/usa/optical_pickups.htm, 2 pgs., printed off Internet on Dec. 5, 2003, and labeled "© 2001-2003".

Ferro Tec USA, Other Applications, http:/www.ferrotec.com/usa/other_applications.htm, 2 pgs., printed off Internet on Dec. 5, 2003, and labeled "© 2001-2003".

Ferro Tec USA, Educational Kits, http:/www.ferrotec.com/usa/educational_kits.htm, 2 pgs., printed off Internet on Dec. 5, 2003, and labeled "© 2001-2003".

Ferro USA Corporation, Company profile, http:/www.avem.org/MemDirF/Ferro.html, 2 pgs., printed off Internet on Dec. 5, 2003.

Nikon, New Eclipse E200, Biological Microscope, Jan. 2000, 2 pgs.

Zoom Lens, L. G. Electronics, Korea, Sep. 8, 1996, 1 pg.

Sony "Color Camera Module, FCB-IX47/IX47P, FCB-IX470/IX470P", 1999, 4 pgs.

Ferrofluidics Exclusion Seal Applications Manual, 1987, 14 pgs.

* cited by examiner

SYSTEMS AND METHODS FOR ACTUATING LENS ASSEMBLIES

This patent application claims priority to copending U.S. Provisional Patent Application Ser. No. 60/437,710, filed Jan. 2, 2003, and entitled "SYSTEMS AND METHODS FOR ACTUATING LENS ASSEMBLIES" by Hovanky, the entire disclosure of which is incorporated herein by reference.

BACKGROUND OF THE INVENTION

The present invention relates generally to optical lenses, and more particularly to lens actuation assemblies.

Current lens systems (e.g., for camcorders, closed circuit television cameras, etc.) typically employ a rotational means of positioning lens elements. In one common method, the rotational motion is generated by a small motor that drives a lead screw mechanism, which in turn linearly drives the attached lens elements. In another common method the entire lens assembly is moved by means of a screw action similar to that of manually adjustable camera lens. In both cases, the motor must drive at excessive angular velocity to achieve desirable zoom or focus lens performance due to the fine thread pitch of either the lens barrel external thread or the lead screw. Using this type of conventional lens positioning technology allows for lens target acquisition times in the order of one second.

SUMMARY OF THE INVENTION

Disclosed herein are systems and methods for actuating lens assemblies (e.g., for purposes of zoom and/or focus lens operations) that may be implemented, for example, in any camera lens or other lens application that employs one or more actuatable lenses. Examples of such lens applications include, but are not limited to, closed circuit television ("CCTV") applications, motion picture/filming camera applications, television studio camera applications, camcorder applications, surveillance cameras, military targeting applications, etc.

In one embodiment, the disclosed systems and methods may be implemented using an electromagnetic actuation system to focus and zoom using linear motion of a lens element along the cylindrical axis of the lens. In one exemplary embodiment, the actuation system may include a tubular coil and tubular magnet assembly that linearly actuates the lens assembly. By eliminating the rotational motion and moving the lens along the cylindrical axis of the lens, the product of the lens inertial mass and the distance the lens has to travel may be reduced, allowing quicker positioning of the lens. Such a disclosed lens positioning system may be implemented in one embodiment to yield a smaller optical lens block and may be further characterized in this embodiment as energy-efficient. Furthermore, in other exemplary embodiments the disclosed lens positioning system may be configured to use simple movement of a lens along the cylindrical axis of the lens to achieve one or more other advantages over current rotational lens positioning technology including, but not limited to, more direct and precise positioning of the lens, much quicker positioning of the lens, greatly reduced lens travel distance, combinations thereof, etc.

Using the disclosed linear actuation technique for lens actuation operations advantageously allows lens positioning times to be greatly reduced from the lens positioning times possible with current lens system technology. For example, in one embodiment, the disclosed linear actuation systems may be implemented to allow for a lens positioning time from beginning to end of linear stroke that is achieved in less than about 250 milliseconds, in another embodiment to allow for a lens positioning time from beginning to end of linear stroke that is achieved in less than about 250 milliseconds, and in another embodiment to allow for a lens positioning time from beginning to end of linear stroke that is achieved in well under about 250 milliseconds. This is compared to current lens system technology that allows for lens target acquisition times in the order of one second. Other advantageous features that may be realized with the implementation of the disclosed linear actuation systems is reduction of parts count, which in turn results in increased reliability and reduced cost.

In another embodiment of the disclosed systems and methods, multiple lens operations (e.g., zoom and focus operations) may be controlled together and in concert such that the speed of the operations are matched, or such that the speed of one operation is controlled as some function of one or more of the other operations. For example, both zoom and focus may be digitally controlled in a tandem manner such that the speed of the focus lens matches or equals that of the zoom lens (or vice-versa), resulting in exceptional response time at a system level.

The disclosed lens actuation systems may be implemented in one embodiment, for example, using moving magnet/stationary coil voice coil technology (e.g., of the type that has been employed in positioning systems for magnetic disk drives) for actuating zoom and/or focus lens operations of a lens assembly in a CCTV surveillance camera. Alternatively or additionally, one or more features of the disclosed lens actuation systems may be implemented with moving coil/stationary magnet voice coil technology for the same purpose/s. When moving magnet/stationary coil technology is employed, it may be implemented in one embodiment to allow for minimal energy consumption, high targeting speed, low component cost and ease of manufacturing; and/or may be implemented in another embodiment with next generation video image sensor and lens optics technologies to enable CCTV video systems that require less power and provide higher performance. Examples of moving magnet/stationary coil voice coil technology as may be implemented in camera positioning may be found in concurrently filed U. S. patent application Ser. No. 10/732,195 entitled "Electromagnetic Circuit And Servo Mechanism For Articulated Cameras", by Hovanky et al., which is incorporated herein by reference.

In various embodiments of the disclosed lens actuation assemblies, a number of exemplary features may be advantageously implemented, alone or in combination. Examples of such exemplary features include, but are not limited to, moving zoom and/or focus lens in an optical lens block (e.g., CCTV optical lens block) using a stationary coil and moving magnet lens positioning mechanism, dynamic damping of zoom or focus lens using a circular viscoelastic spring/damper mechanism, controlling both zoom and focus lens of a lens assembly in a matched and/or tandem manner, and viscous mechanical damping of zoom and/or focus lenses using ferromagnetic fluid linear bearing/s.

In one respect, disclosed herein is a lens assembly, including: a moving magnet component; a stationary coil component; and a moving lens component coupled to the moving magnet component, the moving magnet component configured to move the moving lens component relative to the stationary coil component.

In another respect, disclosed herein is an actuatable lens assembly, including: a voice coil motor assembly, the voice coil motor assembly including at least one stationary coil component and at least one moving magnet component; and a moving lens coupled to the at least one moving magnet component so that the moving lens moves with the moving magnet component relative to the stationary coil component.

In another respect, disclosed herein is an actuatable lens assembly, including: a voice coil motor assembly, the voice coil motor assembly including at least one stationary coil component and at least one moving magnet component; a moving lens coupled to the at least one moving magnet component so that the moving lens moves with the moving magnet component relative to the stationary coil component; a lens assembly housing, the stationary coil component being fixedly coupled to the lens assembly housing, the moving lens being movably disposed within the lens assembly housing so that the moving lens moves with the moving magnet component relative to the lens assembly housing; a lens guidance mechanism coupled between the lens assembly housing and the moving lens, the lens guidance mechanism being configured to guide the moving lens in a reciprocal linear path along the longitudinal axis of the lens assembly; and a damping mechanism configured to dampen movement of the moving lens component relative to the lens assembly housing.

In another respect, disclosed herein is an optical block assembly, including one or more actuatable lens assemblies operatively disposed in a linear light path of the optical block. Each of the one or more actuatable lens assemblies may include: a moving magnet component; a stationary coil component; and a moving lens component coupled to the moving magnet component.

In another respect, disclosed herein is a method of moving a lens disposed within a lens assembly, including providing a lens assembly that includes a moving magnet component, a stationary coil component, and a moving lens component coupled to the moving magnet component, the moving magnet component configured to move the moving lens component relative to the stationary coil component. The method also includes moving the moving lens component by generating current within the stationary coil component.

In another respect, disclosed herein is a lens assembly, including: a stationary lens assembly housing; a moving lens component coupled to the stationary lens assembly housing; a lens actuator coupled to the moving lens component and configured to move the moving lens component relative to the stationary lens assembly housing; and a lens guidance mechanism coupled to the moving lens component, the lens guidance mechanism including one or more ferromagnetic fluid bearings.

DESCRIPTION OF ILLUSTRATIVE EMBODIMENTS

Figure 1:
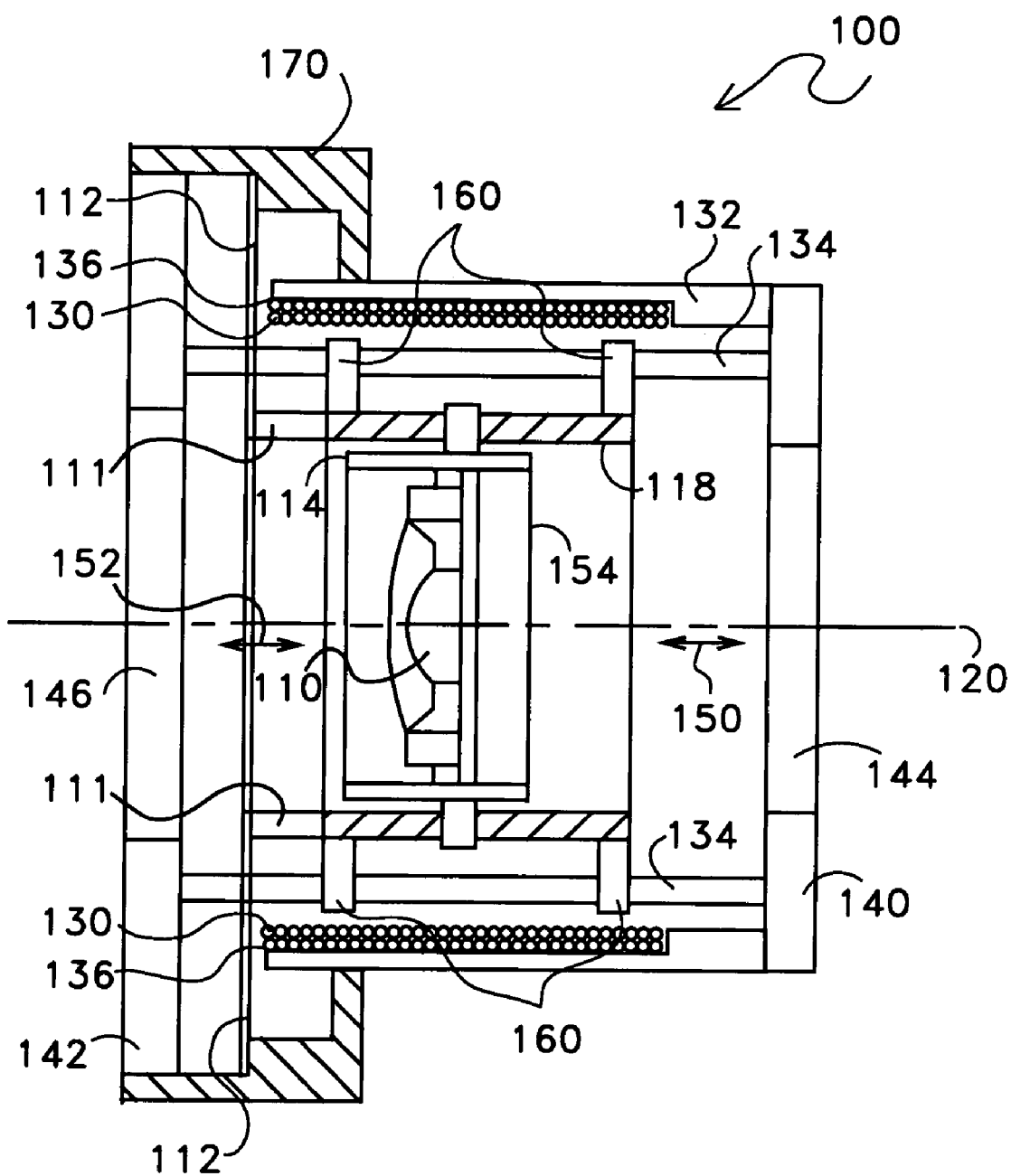
FIG. 1 is a side cross-sectional side view of an actuatable lens assembly according to one embodiment of the disclosed systems and methods.

FIG. 1 illustrates one exemplary embodiment of an actuatable lens assembly 100 configured using an optical design that may be advantageously implemented, for example, to permit small displacement of a moving lens, e.g., focusing lens, relative to conventional lens focus assemblies by using a stationary coil/moving magnet voice coil motor lens actuation configuration. As illustrated, lens assembly 100 includes a moving lens 110 that may be a focus lens, zoom lens, or any other type of moving lens. As shown, moving lens 110 may be housed in a cylindrical lens cup 114 or other lens container structure suitably configured to operatively contain moving lens 110 in a position centered about the longitudinal axis 120 of lens assembly 100. A lens container structure, such as cylindrical lens cup 114, may in turn be coupled to one or more magnet components. In the exemplary embodiment of FIG. 1, a magnet component is shown that is a permanent magnet configured in the form of a cylindrical outer tube/cylinder 118 that is concentrically positioned around cylindrical lens cup 114. In this regard, magnetic tube 118 is exemplary only, and it will be understood that any other configuration and shape of magnet component (e.g., half cylinder shape, bar shape, etc.) may be employed that is suitable for being reciprocably mounted within a lens assembly housing and for interacting with a coil assembly in a manner as described further herein.

In the illustrated embodiment of FIG. 1, magnetic tube 118 is shown concentrically and reciprocably mounted within a lens assembly housing (configured in this exemplary embodiment in the form of cylindrical lens barrel 132) by a lens guidance mechanism coupled between the lens assembly housing and magnetic tube 118. In this embodiment, a lens guidance mechanism is configured in the form of guide shaft mounting members 160 that are slidably received by guide shafts 134 shown suspended between circular end pieces 140 and 142 of lens assembly 100 such that magnetic tube 118 (together with attached cylindrical lens cup 114 and moving lens 110) is movable in either direction along the longitudinal axis 120 (e.g.,. focal axis) of lens assembly 100 as shown by arrows 150 and 152. As so illustrated in the exemplary embodiment of FIG. 1, magnetic tube 118 thus forms a moving magnet component of the stationary coil/moving magnet voice coil motor lens actuation configuration of actuatable lens assembly 100. Together, moving lens 110, cylindrical lens cup 114 and magnetic tube 118 form a lens carrier 154 that is reciprocably movable in either direction along the longitudinal axis 120 of lens assembly 100 as shown by arrows 150 and 152.

Although a lens assembly housing in the form a cylindrical lens barrel 132 is illustrated and described in relation to FIG. 1, it will be understood that a lens assembly housing may be of any other configuration (e.g., non-cylindrical, non-solid, etc.) suitable for structurally containing or otherwise supporting other components of an actuatable lens assembly in relation to each other, and/or in relation to an optical block or other device in which an actuatable lens assembly may be operatively employed.

It will be understood that the exemplary embodiment of FIG. 1 represents only one possible lens carrier configuration for reciprocably positioning a moving lens component and coupled magnet component within a lens assembly. In this regard, a moving lens and magnet may be so positioned within a lens barrel or other lens assembly structure using any combination of fewer components, additional components, or alternative components suitable for achieving the features of the disclosed systems and methods described herein. For example, a moving lens may be coupled directly to a magnet component (e.g., such as magnetic tube 118) without a separate non-magnetic lens container structure such as cylindrical lens cup 114 disposed therebetween. Alternatively, a non-magnetic lens container may be directly and movably coupled to guide shaft mounting members or other suitable guide members within a lens barrel, and at the same time may be separately coupled to a magnet component that is also disposed within a lens barrel.

It will also be understood that a lens guidance mechanism may be of any suitable structure, dimension and/or composition suitable for providing linear guidance of a lens carrier and/or moving lens along a reciprocal (i.e., back and forth) sliding path along the longitudinal axis of a given lens assembly. Furthermore, such a lens guidance mechanism may be coupled between a moving lens component and stationary components of a lens assembly (e.g., lens assembly housing) via any one or more other stationary or moving lens assembly components (e.g., end caps, lens container, etc.).

In one embodiment, one or more guide shafts and corresponding guide mounting member/s may be employed that are of any suitable structure, dimension and/or composition suitable for providing linear guidance of a magnetic tube or any other suitable configuration of lens carrier or moving lens along a reciprocal sliding path along the longitudinal axis of the lens assembly (e.g., when a moving lens is implemented as zoom or focus lens). For example, a cylindrical-shaped guide shaft (e.g., with polished metal outer surface or other low friction sliding surface such as polymer material) may be received in one or more complementary-dimensioned and internally cylindrical-shaped openings within guide shaft mounting members having a similar or different internal sliding surface material that is slidably compatible with the outer surface of the corresponding guide shaft. Alternatively, a guide shaft may have a non-cylindrical outer shape (e.g., square, oval, triangular, etc.) and be received in a complementary-shaped opening of guide shaft mounting member. Further alternatively, a guide shaft may be configured with one or more features (e.g., rail feature, groove feature, slot feature, etc.) for slidably mating with a complementary-dimensioned and shaped feature of a guide shaft mounting member (e.g. wheel or ball bearing feature, tongue feature, pin feature, etc.). Furthermore, it will be understood that one or more guide shaft mounting members fixedly coupled to a moving lens component guide and slidably received by one or more guide shafts fixedly coupled to a lens assembly housing (as illustrated in FIG. 1), or alternatively that one or more guide shaft mounting members fixedly coupled to a lens assembly housing may be slidably received by one or more guide shaft mounting members. Other exemplary embodiments of suitable lens guidance mechanisms include, but are not limited to, ferromagnetic fluid bearings as described hereinbelow with relation to FIGS. 4A and 4B.

It will also be understood that a magnet component may be any material and/or device providing a magnetic field suitable for interacting with a coil assembly as described elsewhere herein. In this regard, a magnet component may be a temporary magnet (e.g., electromagnet device) and/or a permanent magnet. In the practice of the disclosed systems and methods, a permanent magnet component may be composed of any magnetic material/s (e.g., high-energy product hard ferromagnetic material/s) that may be suitably employed to achieve one or more of the features of the disclosed systems and methods described elsewhere herein. Examples of suitable permanent magnetic materials include, but are not limited to, non-ceramic (e.g., non-aluminum nickel cobalt or non-"alnico") magnet materials such as rare earth magnetic materials. In one embodiment, magnetic materials (e.g., rare earth magnetic materials) having an energy product of 20 MegaGauss-Oersted or higher (or of about 20 MegaGauss-Oersted or higher), although other types of permanent magnetic materials (e.g., including ceramic magnetic materials such as alnico magnetic materials) and permanent magnetic materials having lesser coercivity values may be employed where suitable for achieving results for meeting the needs of a given application or embodiment described elsewhere herein. Specific examples of suitable permanent magnetic materials include, but are not limited to, materials comprising neodymium iron boron, samarium cobalt, combinations, thereof, etc. In one exemplary embodiment, neodymium iron boron magnetic material may be cast and magnetized by Dexter Magnetic Technologies of Hicksville, Ky.

Still referring to the exemplary embodiment of FIG. 1, one end of lens barrel 132 is coupled to circular end piece 140, and the opposite end of lens barrel 132 is received in one end of front lens housing member 170. Circular end piece 142 is coupled to the opposite end of front lens housing member 170 as shown. Respective optic openings 144 and 146 are defined in each of circular end pieces 140 and 142 to provide an optical path through lens 110 and lens assembly 100. As illustrated in FIG. 1, front lens housing member 170 has a larger diameter than lens barrel 132. As will be illustrated further herein, the diameter of front lens housing member 170 may be suitably dimensioned and configured to mate with other components of an optical block assembly (e.g., light gathering lens component, optical block housing component, etc.). Also illustrated in FIG. 1, is an optional damping mechanism in the form of a circular spring member 112 that may be attached or otherwise disposed between magnetic tube 118 of lens carrier 154 and front housing member 170 in the manner shown. Circular spring 112 will be described further hereinbelow.

It will be understood that the presence of front lens housing member 170 is optional, and that a lens assembly may be configured in any alternative manner suitable for supporting one or more end caps and/or mating with or otherwise coupling to an optical block assembly. Furthermore, end caps 140 and 142 represent only one exemplary configuration suitable for mounting guide members, such as guide shafts 134, within a lens assembly. For example, one or more guide members may be mounted or otherwise suitably coupled within a lens assembly using any other suitable structure (e.g., mounted by bracket to inner surface of lens barrel, integrally formed or attached as a part of an inner surface of a lens barrel, etc.)

Still referring to FIG. 1, a cylindrically-shaped stationary coil component 130 is shown concentrically disposed and received within a complementary dimensioned recess 136 defined by the inner surface of lens barrel 132. In the practice of the disclosed systems and methods, a coil assembly may be configured as, for example, as one or more layers of a spirally wound conductor coil of suitably conductive and insulated conductor material (e.g., magnet wires, etc.). In the illustrated embodiment, coil assembly 130 is shown configured as a spirally wound conductor coil having two conductor layers, although a coil may have one conductor layer or more than two conductor layers. Using such an exemplary configuration, stationary coil component 130 may be attached on the inner side of the lens barrel 132, for example, so as to allow for easy access to its two terminals on the coil holder side of the lens barrel 132.

FIG. 1 illustrates one exemplary embodiment of a stationary coil as it may be configured and implemented on the inner surface of a lens barrel of a actuatable lens assembly. In this regard, one advantage of such a stationary coil/ moving magnet embodiment is that placement of stationary coil adjacent and/or in contact with a lens assembly housing such as lens barrel 132 allows for improved heat dissipation of the coils via conduction heat transfer with the lens assembly housing. In this regard, the lens assembly housing may be optionally constructed of relatively lightweight thermally conductive material (e.g., such as aluminum, aluminum alloy, copper, copper alloy such as bronze or brass or other suitable thermally conductive metal or other material/s) for efficient heat transfer characteristics.

It will be understood that one or more stationary coil component/s may be configured and/or positioned in any other alternative way relative to other components of the actuatable lens assembly that is suitable for allowing the magnetic field of the coil component/s to operatively interact with the magnetic field of one or more magnet component/s to achieve one or more of the lens actuation features described elsewhere herein. For example, a stationary coil component may alternatively be rectangular in shape. Furthermore, the optimal or desired coil assembly configuration (e.g., number of turns, numbers of conductor layers, etc.) in combination with type and configuration of magnet component and type and configuration of lens assembly housing required to support other components of a given lens assembly may be selected as needed or desired to fit the specifications of a given application, e.g., based on the final product requirement specifications for a given lens assembly, based on anticipated worst case conditions (e.g., gravity at temperature extremes), etc. For example, in one exemplary embodiment, an additional design enhancement may include the use of a shorted-turn coil design that may be employed to reduce the time constant of the system.

Figure 2:
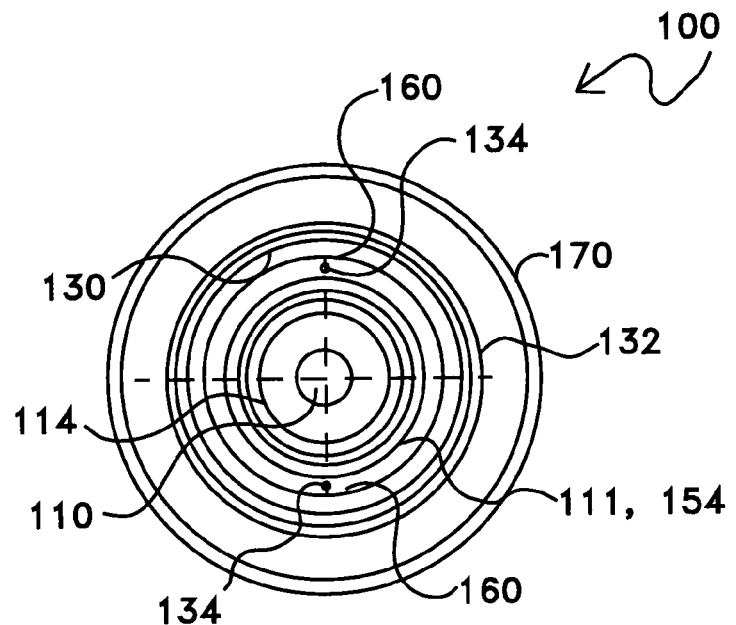
FIG. 2 is a cut-away front view of an actuatable lens assembly according to one embodiment of the disclosed systems and methods.

FIG. 2 is a cut-away front view (ie., end cap 142 cut away and not shown) of the exemplary lens assembly embodiment of FIG. 1. FIG. 2 shows the concentric relationship of various components of lens assembly 100. Not shown in FIG. 2 is optional circular spring member 112.

Figure 3A:
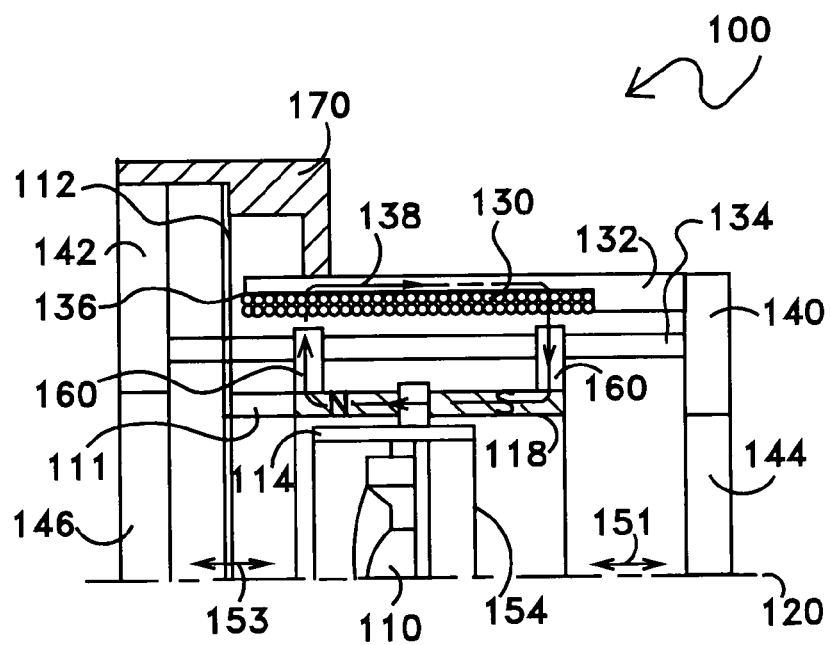
FIG. 3A is a partial side cross-sectional side view of an actuatable lens assembly according to one embodiment of the disclosed systems and methods.

Referring now to FIG. 3A, movement of lens carrier 154 of FIG. 1 relative to stationary components of lens assembly 100 (ie., lens barrel 132, stationary coil component 130, guide shafts 134, front housing member 170 and end caps 140 and 142) may be accomplished in this exemplary embodiment by applying either positive or negative polarity voltage across the terminals of stationary coil component 130 to generate current within the coil and a corresponding magnetic field 138 along the circumference of the coil assembly 130. A permanent magnetic field is applied tangent to the coil assembly 130 by the permanent magnet of magnetic tube 118. The induced electromotive force caused by the cross product of the current vectors of the coil assembly 130 and the magnetic field (B field) vector of magnetic tube 118 causes movement of lens carrier 154 in a direction determined by the polarity of the voltage applied to coil assembly 130 and the resulting direction of generated magnetic field. Thus, bi-directional acceleration of lens carrier 154 is made possible along the longitudinal axis 120 of lens assembly 100 (e.g., the focal axis of a targeting camera). In FIG. 2, the illustrated direction of magnetic field 138 results in movement of lens carrier 154 in the direction indicated by arrows 151 and 153, depending on the polarity of the voltage applied. It will be understood that FIG. 3A illustrates one exemplary magnetic field path as may occur with the implementation of the exemplary embodiment of FIG. 3A. In this regard, other suitable magnetic field paths are possible, e.g., with the implementation of alternate configurations of stationary coil and/or moving magnet components.

Still referring to FIGS. 1, 2 and 3A, mechanical damping of lens carrier 154 may be achieved in one exemplary embodiment by employing a damping mechanism in the form of a circular spring member 112 that may be attached or otherwise disposed between magnetic tube 118 of lens carrier 154 and front housing member 170 in the manner shown. For example, circular spring member 112 may be fixedly attached to and supported by an external ring 111 (e.g., external plastic ring or external ring of other suitable material) that may be in turn fixedly attached to the front surface of magnetic tube 118, e.g., by adhesive, press-fitting or any other suitable method. Alternatively, circular spring member 112 may be fixedly attached to the front surface of magnetic tube 118 directly by adhesive. In either case, the circular spring member may also be fixedly attached at its periphery to an interior surface of front lens housing member 170 shown, so that it flexes and bends with movement of magnetic tube 118 relative to front lens housing member 170. As previously described, electromotive force may be induced between coil assembly 130 and magnetic tube 118 to enable bi-directional acceleration of lens carrier 154 and associated bidirectional flexing of circular spring member damping mechanism 112 along the longitudinal axis 120 of lens assembly 100.

Figure 3B:
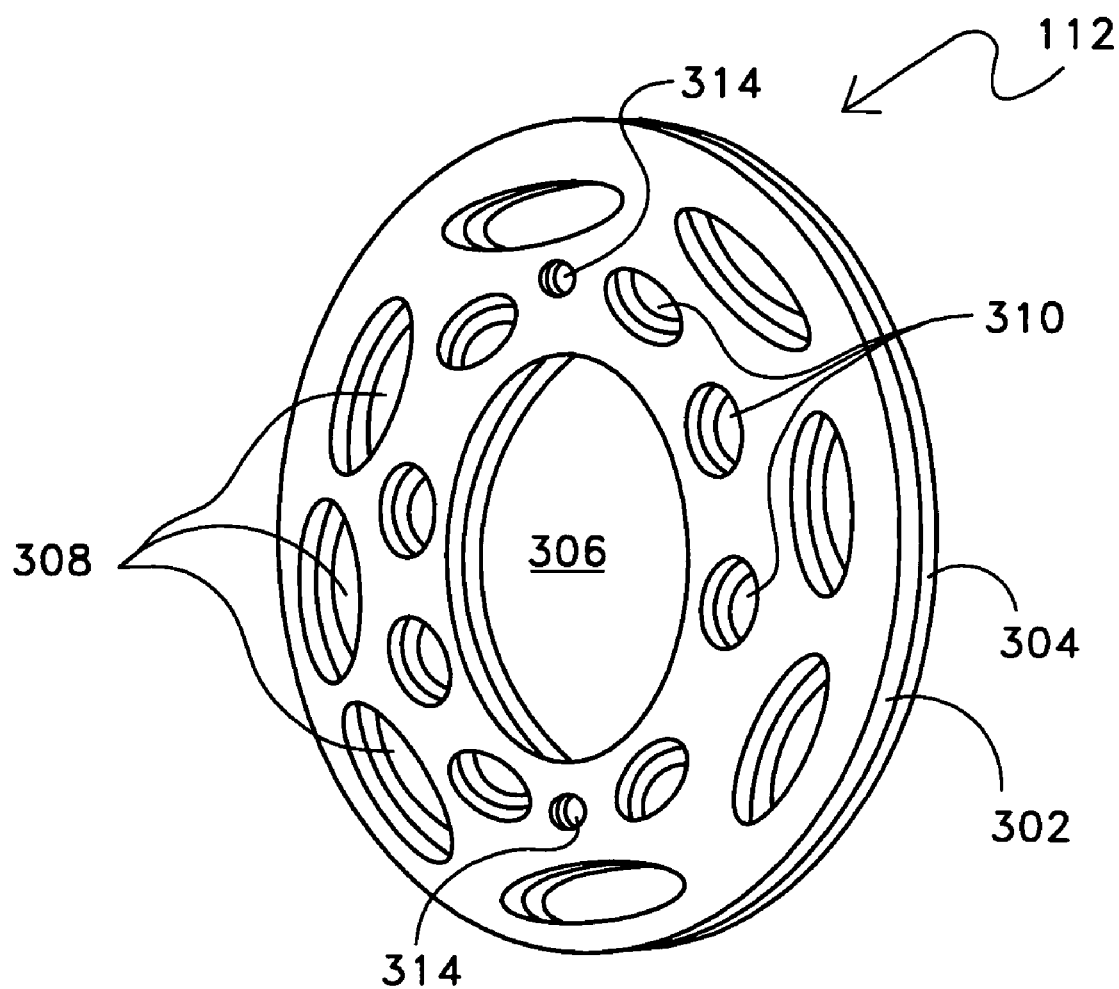
FIG. 3B is a perspective view of a circular spring member according to one embodiment of the disclosed systems and methods.

A circular spring member damping mechanism may be formed from one or more layers of resilient material/s that may be optionally laminated with one or more other materials (e.g., damping materials) and/or patterned or cut to obtain a desired shape, size and/or stiffness. FIG. 3B shows a perspective view of one exemplary embodiment of a circular spring member 112 as it may be implemented as a damping mechanism. In the illustrated embodiment, spring member 112 is shown formed of a resilient material layer 302 that is laminated to an optional damping material layer 304, and having an optic opening 306 die cut therein to provide an optical path through lens 110 when assembled to lens assembly 100. Openings 314 are also shown provided for being slidably received around guide shaft members 134.

Still referring to FIG. 3B, resilient material layer/s may be formed from any material/s suitable for providing a desired resiliency under operating conditions of a given application including, but not limited to resilient metals such as spring steel, beryllium copper alloy, etc. Thickness of a resilient material layer/s may be selected based on desired stiffness of the circular spring member. Optional damping material layer/s may be formed from any material/s having characteristics and thickness suitable for damping mechanical vibration during flexing of circular spring member. In one embodiment, damping material layer/s may be formed from elastomeric materials (e.g., rubber, silicon, viscoelastic polymers, etc.). Specific examples include, but are not limited to viscoelastic tapes such as viscoelastic vibration damping tape series 434, 435, 436 available from 3M™ of Maplewood, Minn. (e.g., aluminum foil constraining layer coated with pressure-sensitive viscoelastic polymer). In one exemplary embodiment, resilient layer 302 may be spring steel having a thickness of about 0.002 inches, and damping material layer 304 may be 3M™ viscoelastic vibration damping tape having a thickness of about 0.006 inches. In this exemplary embodiment, spring member 112 may have an overall thickness of about 0.008 inches.

As further illustrated in FIG. 3B, a circular spring member may be patterned with secondary openings to further control stiffness of the circular spring member. In the illustrated embodiment, circular spring member 112 is patterned with two concentric rows of die cut oval-shaped secondary openings 308 and 310. As illustrated, one row of secondary openings (e.g., secondary openings 310) may be offset from an adjacent row of secondary openings (e.g., secondary openings 308) so that the openings of different rows do not line up on the same radial line extending outward from the center of the spring member. Although two rows of secondary openings are illustrated in FIG. 3B, it will be understood that one row of secondary openings, or that three or more rows of openings may be present as necessary or desired to achieve the desired stiffness of a circular spring member for a given lens assembly application. Secondary openings may also have any suitable shape, e.g., oval, round, irregular, etc.

Figure 3C:
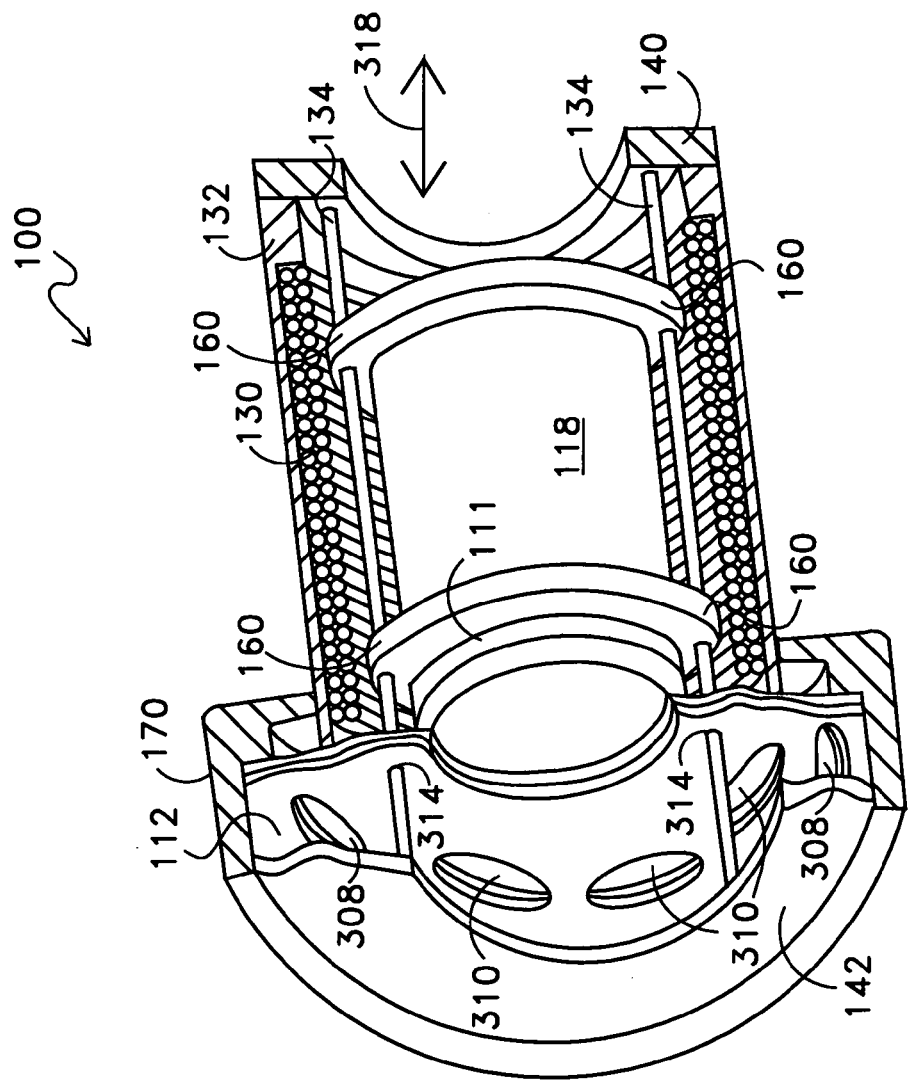
FIG. 3C is a partial cut-away side view of an actuatable lens assembly according to one embodiment of the disclosed systems and methods.
Figure 3D:
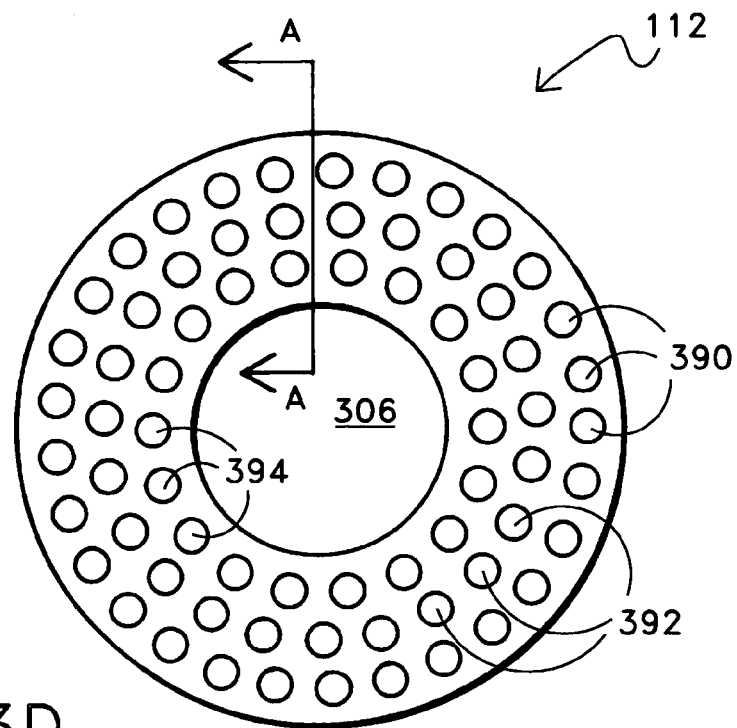
FIG. 3D is a front view of a circular spring member according to one embodiment of the disclosed systems and methods.
Figure 3E:
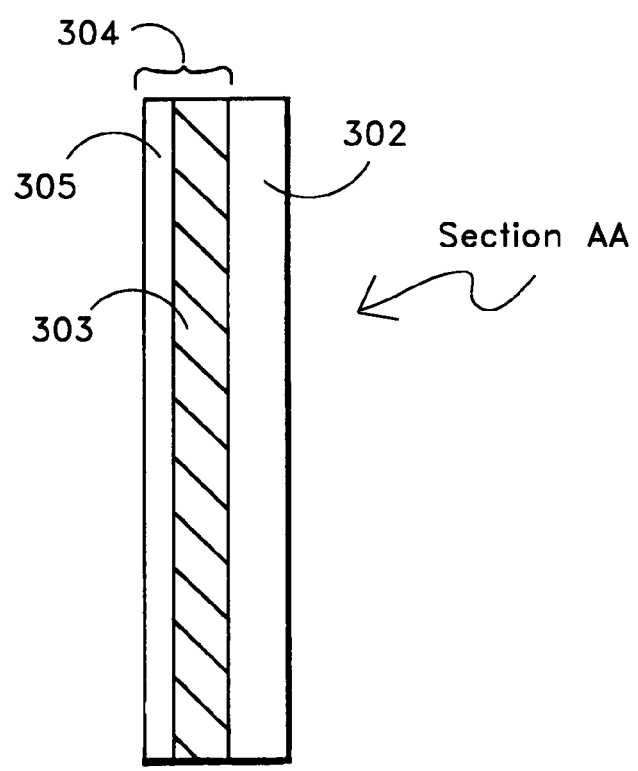
FIG. 3E is a side sectional view of the circular spring member of FIG. 3D.

FIG. 3D shows a front view of an alternate embodiment of circular spring member 112 having three respective rows of secondary openings 390, 392 and 394. In one exemplary embodiment, circular spring member 112 may be configured for use with a ¼" lens, and may have an outside diameter of about 1.2" and opening 306 may have a diameter of about 0.6". In this embodiment, secondary openings 390, 392 and 394 may be circular openings having a diameter of about 0.06". Secondary openings 390, 392 and 394 may be spaced at radial intervals of 20 degrees around the circular spring member, and positioned in such a way that the openings of each adjacent row are radially staggered relative to the openings of adjacent row/s. FIG. 3E shows a cross section AA of circular spring member 112 of FIG. 3D, showing resilient material layer 302 (e.g., spring steel) having a thickness of from about 0.001 to about 0.002 inches that is laminated to viscoelastic damping material layer 304. As shown damping material layer 304 may include viscoelastic material layer 303 having a thickness of from about 0.004" and liner layer 305 that may be, for example, a thin carrier material layer (e.g., about 0.01" to about 0.03" layer) of stainless steel, mylar, polycarbonate, aluminum, etc.

FIG. 3C illustrates a partial cut-away perspective view of actuatable lens assembly 100, showing relative position of circular spring member and other components of assembly 100 as they may be configured in one exemplary embodiment so that spring member 112 flexes with magnetic tube 118 as it is displaced backwards and forwards relative to lens barrel 132 in the directions indicated by arrow 318.

Although a single circular spring member 112 has been illustrated and described as a damping mechanism, it will be understood that any other suitable damping mechanism/s (e.g., other types and configurations of spring members, other mechanisms such as described and illustrated below in relation to FIGS. 4A and 4B, etc.) may be employed to dampen movement between a moving lens or lens carrier and stationary components of a lens assembly. For example, one or more circular spring members may be coupled between a lens carrier and stationary components of a lens assembly at one or more positions between the lens carrier and the stationary components (e.g., at either or both ends of the lens carrier 154, at an intermediate point of the lens carrier 154, etc.). In an alternative example, one or more linear circular spring members may be concentrically disposed around one or more guide shaft members 134, e.g., between an end cap 140 or 142 and a guide shaft mounting member 160, in a manner suitable for damping movement of lens carrier 154 relative to the respective end cap 140 or 142.

Figure 4A:
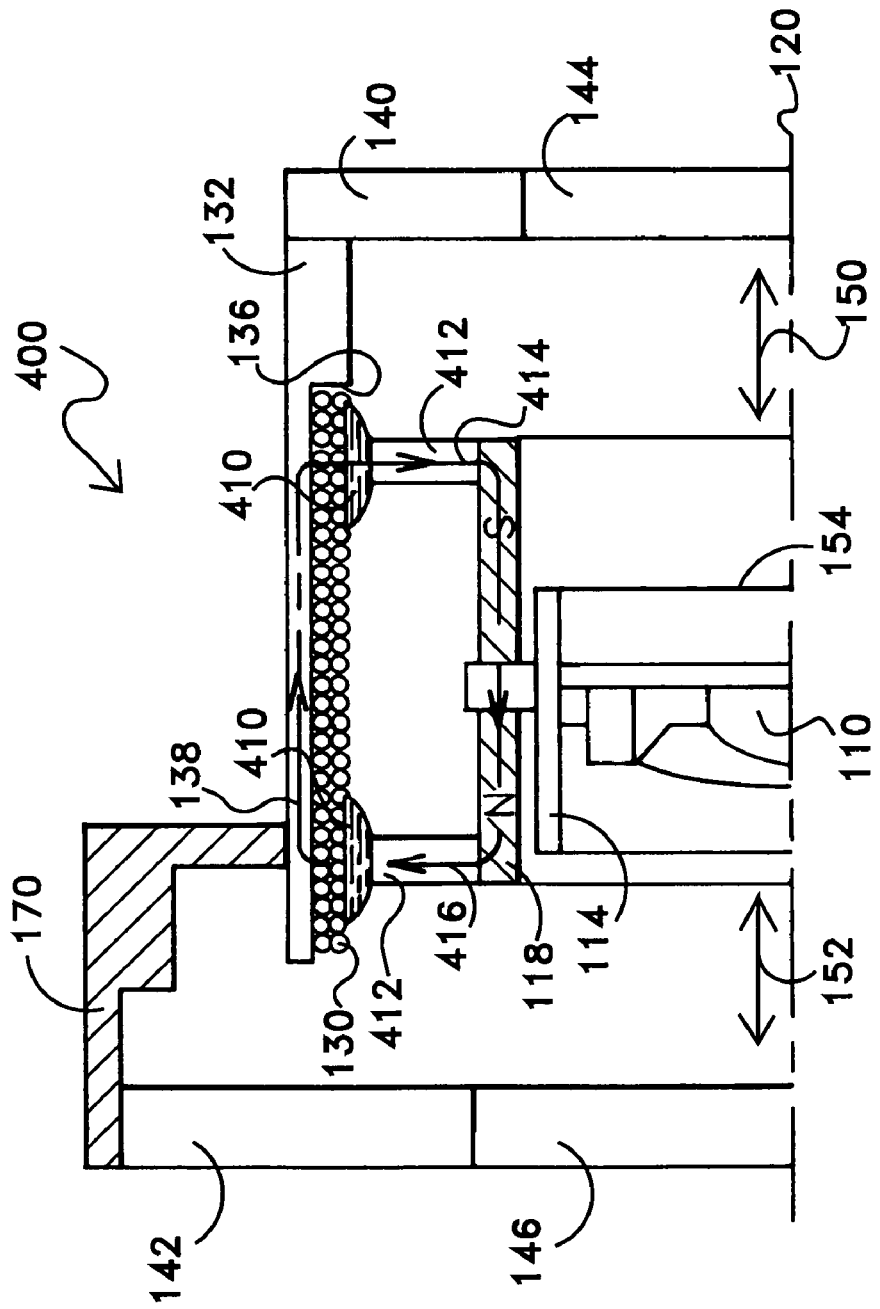
FIG. 4A is a partial side cross-sectional view illustrating ferromagnetic bearing and mechanical damping of zoom or focus lens according to one embodiment of the disclosed systems and methods.

In yet another exemplary embodiment illustrated in FIG. 4A, an actuatable lens assembly 400 may be configured using one or more ferromagnetic fluid bearings 410 as an alternate approach to providing mechanical damping and linear guidance of a lens carrier 154 and moving lens 110 (e.g., when implemented as zoom or focus lens) relative to stationary components of lens assembly 400. In such an embodiment, ferromagnetic fluid bearings 410 act as both lens guidance mechanisms and as damping mechanisms for lens assembly 400. As illustrated in FIG. 4A, ferromagnetic fluid bearings 410 are contained O-ring shaped pockets of a ferromagnetic fluid that may be characterized as a colloidal suspension of submicron-sized magnetically permeable particles (e.g., Ferrofluid manufactured by Ferrotec Corporation of Nashua N.H., etc.) that is of suitable viscosity and lubricity to act as a fluid bearing between the inner surface of stationary coil 130 (and/or lens barrel 132) and outer bearing contact surfaces of annular fluid bearing support members 412 that act to support and suspend lens carrier 154 concentrically within lens barrel 132 in the manner shown. When inherently viscous ferromagnetic fluid/s are employed as a damping mechanism, the need for costlier and more complicated mechanical damping mechanisms (e.g., employing springs, rings and/or other mechanical device/s) may be eliminated. This translates into further cost savings and increased reliability for the lens assembly 400.

In the exemplary embodiment illustrated in FIG. 4A, ferromagnetic fluid bearings 410 and fluid bearing support members may be advantageously positioned adjacent the two concentrated magnetic field return paths 414 and 416 from the permanent magnet of magnetic tube 118 so that flux paths 414 and 416 travel through the contained pockets of ferromagnetic fluid bearings 410 in such a way as to contain the ferromagnetic fluid within the O-ring shaped fluid pockets in the annular space between fluid bearing support members 412 and the inner surface of stationary coil 130 (and/or lens barrel 132). In one exemplary embodiment, this annular space may be formed from a gap of from about 0.005 inches to about 0.01 inches between fluid bearing support members 412 and the inner surface of stationary coil 130 (and/or lens barrel 132), although greater or lesser gap thicknesses are also possible. One of the advantages of the configuration of this embodiment is that an existing magnet component (e.g., magnetic tube 118) may be employed having sufficient magnetic field to contain ferromagnetic fluid bearings so that separate low energy product rubber or ceramic-based magnets typically required for a ferromagnetic fluid bearing are not needed, resulting in cost savings to the overall lens assembly. However, it will be understood that in other embodiments, any other ferromagnetic fluid bearing configuration may be employed that is suitable for providing mechanical damping and/or linear guidance of a lens carrier and/or moving lens.

Figure 4B:
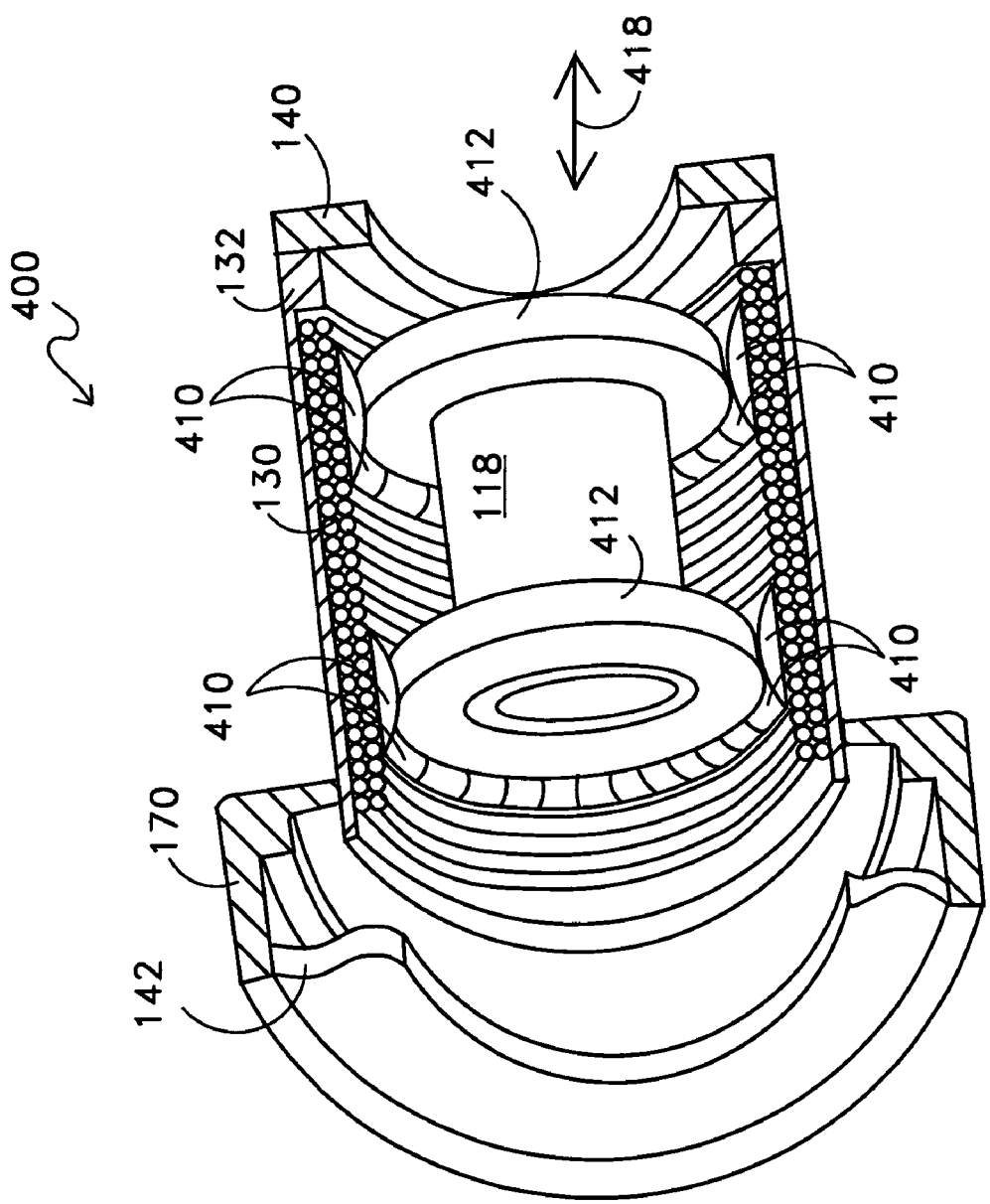
FIG. 4B is a partial cut-away side view of an actuatable lens assembly according to one embodiment of the disclosed systems and methods.

FIG. 4B illustrates a partial cut-away perspective view of actuatable lens assembly 400, showing relative position of ferromagnetic fluid bearings 410, fluid bearing support members 412 and other components of assembly 400 as they may be configured in one exemplary embodiment so that ferromagnetic fluid bearings 410 move with magnetic tube 118 and fluid bearing support members 412 as magnetic tube 118 is displaced backwards and forwards relative to stationary coil component 130 and lens barrel 132 in the directions indicated by arrow 418. Although illustrated ferromagnetic fluid bearings 410 are illustrated employed in an actuatable lens assembly 400 that employs a stationary coil 130 and moving magnetic tube 118 of the disclosed systems and methods, it will be understood that a similar ferromagnetic fluid bearing mechanism may be employed with actuatable lens assemblies that employ conventional actuators. For example, a magnetic tube 118 may be actuated to move relative to a cylindrical lens barrel 132 without the presence of stationary coil component 130 by using a shaft coupled between a DC motor and tube 118 and/or support members 412. In such an embodiment, ferromagnetic fluid bearings 410 act to dampen the motion of the conventional DC motor actuator. If desired, separate permanent magnet members may be provided to contain the ferromagnetic fluid bearings 410 so that tube 118 does not need to be magnetic.

In one exemplary embodiment, inertial absorbent crash stops (not shown) may be employed to absorb impact energy between stationary and moving components of the lens assembly upon start-up calibration, e.g., during a lens initialization process. Such inertial absorbent crash stops may be placed at any location, and be of any configuration, that is suitable for absorbing impact between a moving magnet component (e.g., such as magnetic tube 118) and stationary components of a lens assembly (e.g., stationary end caps 140 and 142) at the end stop positions of the assembly. Examples of suitable inertial crash stops include, but are not limited to, elastomeric materials such as silicone, rubber, elastomeric polymers, etc. One specific example of suitable material is silicone-elastomer thermally conductive interface pad material available from 3M™ of Maplewood, Minn. Suitable locations for placement of crash stops include, but are not limited to, placement of O-ring shaped pieces of suitable crash stop material placed around guide shafts 134 at the intersection points of guide shafts 134 with end caps 140 and 142 of a lens assembly 100. Suitable crash stop material may also be placed at appropriate contact points between magnetic tube 118 (and/or bearing support members 412) and end caps 140 and 142 of a lens assembly 400.

In another exemplary embodiment of the disclosed systems and methods, a home position of lens carrier 154 may be optionally detected, for example, by an optical sensor or by current sensing techniques. In this regard, home position of a lens carrier/moving lens may be characterized as being a location arbitrarily selected where relative position of a lens carrier 154 may be referenced (e.g., such as at an end stop position of the moving components of the lens assembly relative to stationary components of the lens assembly). Having the capability to detect a home position of a lens carrier/moving lens advantageously allows determination of velocity and displacement in real time of the lens carrier/moving lens, e.g., based on the home position(s) and the back electromotive ("emf") force of the moving magnet component of the lens assembly. Such a determination may be made, for example, by using a calibration look up table to correlate values of velocity and position, by means of feedback from a magneto-resistive or other type of position sensor to measure position, etc.

Figure 5:
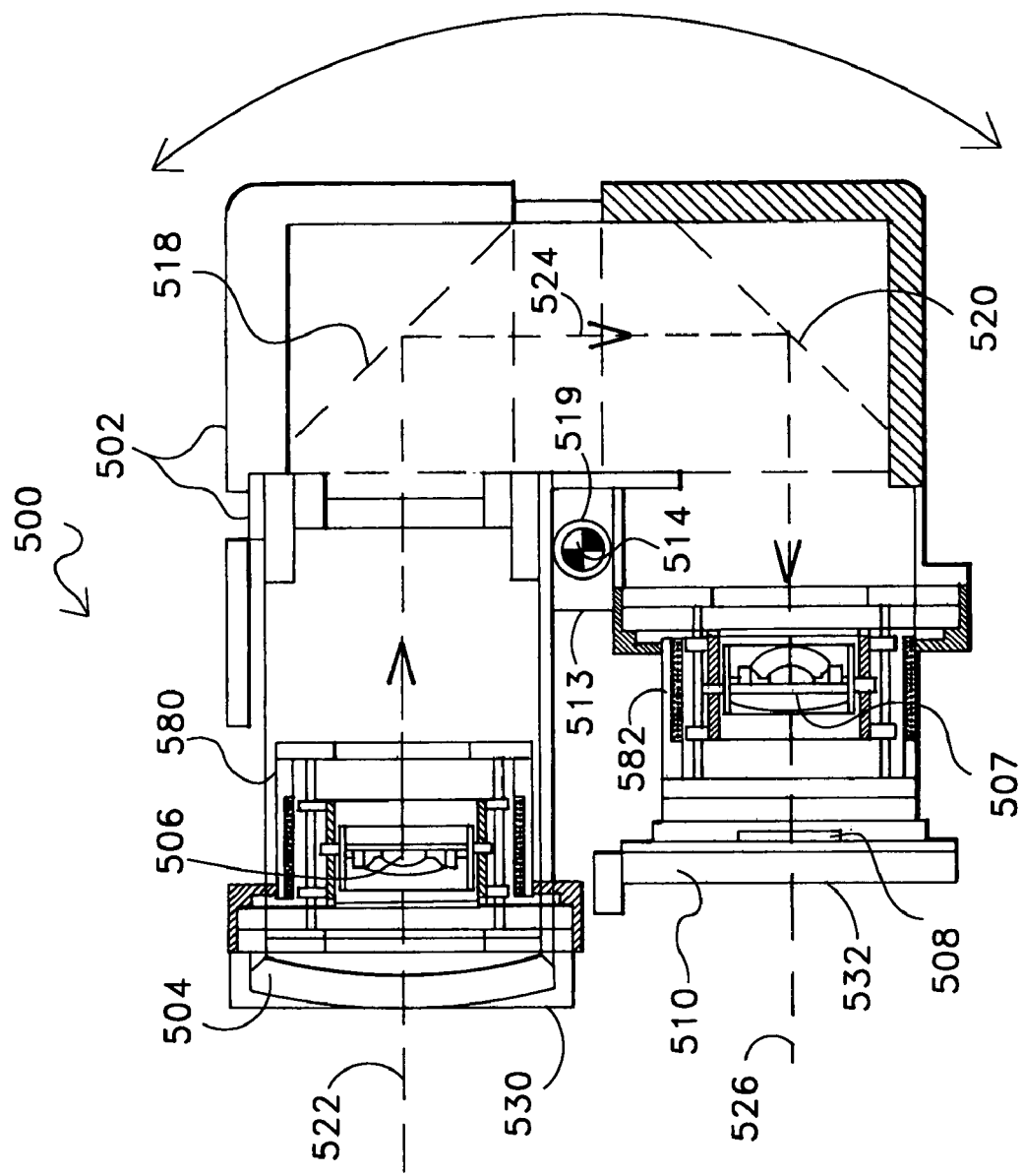
FIG. 5 is a side cross sectional side view of a folded optical lens block application according to one embodiment of the disclosed systems and methods.
Figure 6:
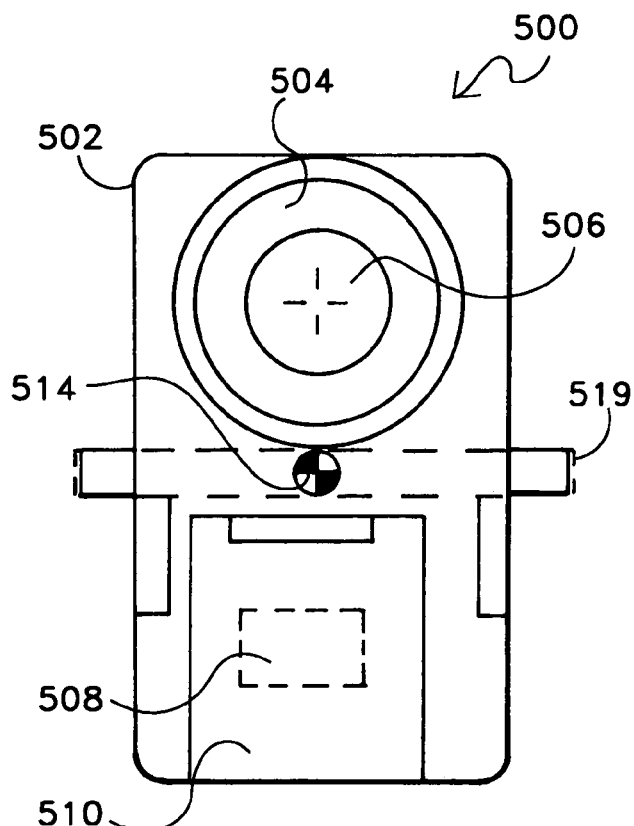
FIG. 6 is a front view of a folded optical lens block application according to one embodiment of the disclosed systems and methods.

The actuatable lens assemblies of the disclosed systems and methods may be advantageously implemented in a variety of environments. For example, FIGS. 5 and 6 depict one exemplary embodiment of the disclosed systems and methods in which the disclosed voice coil lens actuation systems are employed for both zoom and focus lens assemblies of a single dual-stage folded optical lens block 500. As illustrated in FIG. 5, dual-stage folded light path optical block assembly 500 includes an optical block housing 502 that maintains in operative relationship a pair of 90-degree reflecting prisms 518 and 520, a movable zoom lens assembly 580 having moving zoom lens 506, a movable focus lens assembly 582 having moving focus lens 507, and image sensor circuit board assembly 510. In this regard, each of lens assembly 580 and lens assembly 582 are shown configured with stationary coil assembly component and moving magnet mechanism component in a manner similar to lens assembly 100 of FIGS. 1, 2, 3A and 3C. As illustrated, prisms 518 and 520 are operatively disposed to form an optical path between a light or image gathering lens 504 and an image sensor 508 of assembly 500.

Still referring to FIG. 5, light gathering lens 504 is configured to provide a first or initial linear light path defined between light gathering lens 504 at front end 530 of assembly 500 and first 90-degree reflecting prism 518. As shown, the first or initial linear light path of assembly 500 extends through zoom lens assembly 506 and has a longitudinal axis 522. A first stage folded light path is provided by first 90-degree reflecting prism 518 that is configured to provide a second or intermediate linear light path between first 90-degree reflecting prism 518 and second 90-degree reflecting prism 520. As shown, the second or intermediate linear light path of assembly 500 has a longitudinal axis 524. A second stage folded light path is provided by second 90-degree reflecting prism 520 that is configured to provide a third or terminal linear light path between second 90-degree reflecting prism 520 and image sensor 508 positioned at back end 532 of assembly 500. As shown, the third or terminal linear light path of assembly 500 extends through focus lens assembly 507 and has a longitudinal axis 526.

As illustrated in FIGS. 5 and 6, dual-stage folded light path optical block assembly 500 is configured with a mounting bracket 513 that provides a pivot point 519 for assembly 500 that coincides with center of gravity 514 of assembly 500 so that the center of rotation of assembly 500 is located at or near the center of gravity of the lens assembly. In one exemplary embodiment, bracket 513 may be employed to rotate or tilt assembly 500 around assembly pivot point 519 in the directional plane indicated by the arrow in FIG. 5 (e.g., rotated in a plane parallel with a plane defined by longitudinal axes 522, 524 and 526 of respective first, second and third linear light paths of assembly 500). In this exemplary embodiment, bracket 513 may also be optionally employed to rotate or pan the assembly 500 at pivot point 519 (e.g., rotated in a plane perpendicular with a plane defined by longitudinal axes 522, 524 and 526 of respective first, second and third linear light paths of assembly 500), and/or to rotate assembly 500 in a plane oriented diagonally with a plane defined by longitudinal axes 522, 524 and 526 of respective first, second and third linear light paths of assembly 500. In this exemplary embodiment, rotation in the pan axis direction may be further characterized as being rotation of the assembly about a vertical axis, and rotation in the tilt axis direction may be further characterized as being rotation of the assembly about a horizontal axis.

In those embodiments employing multiple lens assemblies for a given optical block (e.g., such as the zoom and focus lens assemblies 580 and 582 of optical block 500 of FIG. 5), the same type and configuration of permanent magnet component and coil assembly component may be designed for use together to move the lens carrier/moving lens component of any given lens assembly employed in the optical block (e.g., for use together in either of the zoom or focus lens assemblies 580 and 582 so that the same magnet and coil components are interchangeable between zoom lens assembly 580 and focus lens assembly 582). In this way, an economy of scale may be achieved due to commonality of components, thus reducing lens optical block cost. Further information on examples of single and multi-stage folded optical blocks with which the disclosed systems and methods may be suitably implemented may be found in concurrently filed U.S. patent application Ser. No. 10/732,193, entitled "Optical Block Assembly", by Hovanky et al.

In one exemplary embodiment, the relationship between focus operations and zoom operations performed by respective focus and zoom mechanisms of the same optical block (e.g., such as the zoom and focus lens assemblies 580 and 582 of optical block 500 of FIG. 5) may be controlled to optimize focus performance, e.g., in view of the nature of the focus feed back mechanism. Such an embodiment may be implemented for any type of zoom and/or focus actuation systems (e.g., including those actuated by voice coil motor, stepper motor, combinations thereof, etc.), but in one exemplary embodiment may be advantageously implemented using voice coil actuation of the zoom mechanism in conjunction with matched performance voice coil actuation of the focus mechanism of the same optical block (meaning the respective voice coil actuator used for the focus mechanism is capable of the same speed or faster performance relative to the voice coil actuator used for the zoom mechanism). It will be understood that such control of zoom and/or focus lens assembly actuation systems may be accomplished using any control mechanism suitable for lens assembly control (e.g., internal or external computer processor/s coupled to the actuation systems of the focus and/or zoom lens assemblies of an optical block, etc.)

Figure 7:
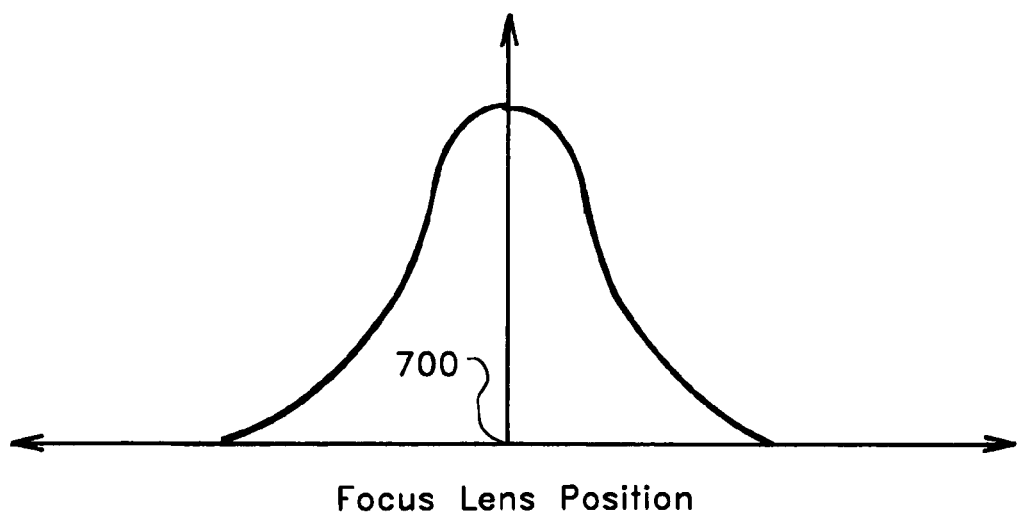
FIG. 7 shows spatial energy versus focus lens position according to one embodiment of the disclosed systems and methods.

For example, one exemplary feedback mechanism for determining the optimal focus position may be based on determining the maximum spatial high frequency energy content in the image or within selected sections of the image. Measurement of spatial high frequency energy content as a function of focus position of a moving focus lens (e.g., such as moving focus lens 507 of FIG. 5) may be accomplished, for example, by using magneto resistive sensors in combination with the disclosed voice coil lens actuation systems, or using any other suitable methodology. As shown in FIG. 7, this spatial high frequency energy content (in the frequency domain) is symmetric around the optimal focus position 700. In one exemplary embodiment using such a feedback implementation, the focus lens assembly mechanism may sweep through the optimal position 700 in order to determine the optimal solution 700 since the energy function does not provide a definitive indication as to direction. In such an embodiment, it may be advantageous to implement the disclosed actuatable lens assemblies as very fast focus lens assembly mechanisms. Advantageously, the disclosed lens assemblies may be so implemented as respective focus and zoom lens assemblies in a common optical block so that the focus lens assembly is configured to dither a moving focus lens around the optimal focus solution 700 (ie., focus lens position having a maximum spatial energy) using feedback data as the focal point is changed due to a change in position of a moving zoom lens of the zoom lens assembly present in the same optical block. Alternatively, it is possible in another exemplary embodiment to map the zoom position of a moving zoom lens to the optimal focus position of a moving focus lens of a common optical block, although such predictive solutions may also be dependent upon other factors (e.g., such as temperature and manufacturing tolerances) and in some cases may provide less performance, yet still be desirably employed to meet the needs of a given application. In another exemplary embodiment, a shading histogram may be employed as a measure of the quality of the focus solution.

Thus, the disclosed systems and methods may be implemented in one exemplary embodiment as described herein to provide zoom and focus lens assembly mechanisms for a common optical block that are matched in performance to optimize focus operation performance, e.g., for high speed zoom operations. This is advantageous since use of zoom and focus mechanisms that are matched in performance helps avoid perceptible periods where the image is out of focus during each high speed zoom operation, as has been observed to be the case for non-matched systems. Such out of focus problems are amplified in applications such as CCTV surveillance scenarios. In the case of recorded video, use of video frames for evidence or any form of visual information retrieval may also be hampered by such transient lack of focus during high speed zoom operations. However, it will be understood that matched zoom and focus mechanisms are not necessary to obtain the benefit of the disclosed systems and methods, and that a common optical block may also be suitably configured with zoom and focus lens assembly mechanisms having unmatched performance.

Although not necessary, further optimization of focus performance may be achieved by controlling zoom and focus operations in tandem manner, e.g., by using algorithm/s implemented by software or other suitable method to control the relationship between the performance of the zoom and focus operations. For example, performance of a focus actuator or lens assembly mechanism may be matched with a zoom actuator or lens assembly mechanism by varying the performance of either or both actuator mechanisms to achieve optimal focusing performance and/or to achieve optimal zooming performance, e.g., even when the actual stand-alone performance of the two components is different. For example, a computer processor may be employed to synchronize control of the focus lens assembly actuator (e.g., voice coil motor) and the zoom lens assembly actuator (e.g., voice coil motor) in tandem using a look up table.

It will be understood that FIGS. 1–7 illustrate exemplary embodiments of stationary coil and moving magnet configurations that may be implemented in the practice of the disclosed systems and methods. In this regard, any other configuration of one or more stationary coil components relative to one or more moving magnet components may be employed that is suitable for inducing movement of a moving lens component that is structurally coupled to the moving magnet component/s in response to current flow through the stationary coil component/s, e.g., by producing an induced and temporary magnetic field capable of interacting with the permanent magnetic field of the moving magnet component/s so as to produce sufficient force to move the moving magnet component/s and attached moving lens component relative to the stationary coil component/s.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

REFERENCES

The following references, to the extent that they provide exemplary system, apparatus, method, or other details supplementary to those set forth herein, are specifically incorporated herein by reference.

U.S. Provisional patent application Ser. No. 60/437,713 entitled "Systems And Methods For Location Of Objects", by Richard G. Washington.

Concurrently filed U.S. patent application Ser. No. 10/732,174 entitled "Systems And Methods For Location Of Objects", by Richard G. Washington.

U.S. Provisional patent application Ser. No. 60/437,711 entitled "Electromagnetic Circuit And Servo Mechanism For Articulated Cameras", by Thao D. Hovanky.

Concurrently filed U.S. patent application Serial No. 10/732,195 entitled "Electromagnetic Circuit And Servo Mechanism For Articulated Cameras", by Thao D. Hovanky et al.

U.S. Provisional patent application Ser. No. 60/437,712 entitled "Slip Ring Apparatus", by Richard G. Washington and Thao D. Hovanky.

Concurrently filed U.S. patent application Ser. No. 10/732,924 entitled "Slip Ring Apparatus", by Richard G. Washington and Thao D. Hovanky.

U.S. Provisional patent application Ser. No. 60/437,690 entitled "Optical Block Assembly", by Thao D. Hovanky and Richard G. Washington.

Concurrently filed U.S. patent application Ser. No. 10/732,193 entitled "Optical Block Assembly", by Thao D. Hovanky and Richard G. Washington.

U.S. Provisional patent application Ser. No. 60/437,709 entitled "Thermoelectric Cooled Imaging Apparatus", by Richard G. Washington and Thao D. Hovanky.

Concurrently filed U.S. patent application Ser. No. 10/732,192 entitled "Thermally Cooled Imaging Apparatus", by Richard G. Washington and Thao D. Hovanky.

U.S. Provisional patent application Ser. No. 60/456,294 entitled "Systems And Methods For Creation, Transmission, And Viewing Of Multi-Resolution Video", by Richard G. Washington.

What is claimed is:

1. A lens assembly, comprising:
a moving magnet component;
a stationary coil component; and
a moving lens component coupled to said moving magnet component, said moving magnet component configured to move said moving magnet component relative to said stationary coil component;
wherein said stationary coil component is disposed around said moving lens component; and
further comprising a damping mechanism coupled to said moving lens component.

2. The lens assembly of claim 1, wherein said moving magnet component comprises a permanent magnet.

3. The lens assembly of claim 2, further comprising a lens guidance mechanism coupled to said moving lens component.

4. The lens assembly of claim 3, wherein said lens guidance mechanism comprises one or more guide shaft mounting members movably received by one or more guide shafts.

5. The lens assembly of claim 3, wherein said lens guidance mechanism comprises one or more ferromagnetic fluid bearings.

6. The lens assembly of claim 2, wherein said damping mechanism comprises one or more spring members.

7. The lens assembly of claim 2, wherein said damping mechanism comprises one or more ferromagnetic fluid bearings.

8. The lens assembly of claim 2, wherein said moving lens component comprises a moving focus lens or a moving zoom lens.

9. The lens assembly of claim 2, wherein said lens assembly is configured to be positioned in a linear light path of an optical block.

10. The lens assembly of claim 9, wherein said optical block comprises a folded light path optical block.

11. The lens assembly of claim 10, wherein said optical block comprises a closed circuit television optical block.

12. An actuatable lens assembly, comprising:
a voice coil motor assembly, said voice coil motor assembly comprising at least one stationary coil component and at least one moving magnet component;
a moving lens coupled to said at least one moving magnet component so that said moving lens moves with said moving magnet component relative to said stationary coil component; and
a lens assembly housing, said stationary coil component being fixedly coupled to said lens assembly housing;
wherein said stationary coil component is disposed around said moving lens; and
further comprising a damping mechanism configured to dampen movement of said moving lens relative to said lens assembly housing.

13. The lens assembly of claim 12, wherein said moving magnet component comprises a permanent magnet.

14. The lens assembly of claim 13, further comprising a lens guidance mechanism coupled between said lens assembly housing and said moving lens, said lens guidance mechanism being configured to guide said moving lens in a reciprocal linear path along the longitudinal axis of said lens assembly.

15. The lens assembly of claim 13, wherein said lens assembly housing comprises a lens barrel concentrically disposed around said moving lens, and wherein said stationary coil component comprises a spirally wound conductor coil disposed adjacent the inner side of said lens barrel.

16. The lens assembly of claim 15, wherein said stationary coil component is thermally coupled to said inner side of said lens barrel; and wherein said lens barrel comprises a thermally conductive material.

17. The lens assembly of claim 13, wherein said moving lens comprises a moving focus lens or a moving zoom lens.

18. The lens assembly of claim 13, wherein said lens assembly is configured to be positioned in a linear light path of an optical block.

19. The lens assembly of claim 18, wherein said optical block comprises a folded light path optical block.

20. The lens assembly of claim 18, wherein said optical block comprises a closed circuit television optical block.

21. An actuatable lens assembly, comprising:
a voice coil motor assembly, said voice coil motor assembly comprising at least one stationary coil component and at least one moving magnet component; and
a moving lens coupled to said at least one moving magnet component so that said moving lens moves with said moving magnet component relative to said stationary coil component; and
a lens assembly housing, said stationary coil component being fixedly coupled to said lens assembly housing, said moving lens being movably disposed within said lens assembly housing so that said moving lens moves with said moving magnet component relative to said lens assembly housing;
a lens guidance mechanism coupled between said lens assembly housing and said moving lens, said lens guidance mechanism being configured to guide said moving lens in a reciprocal linear path along the longitudinal axis of said lens assembly; and
a damping mechanism configured to dampen movement of said moving lens relative to said lens assembly housing.

22. The lens assembly of claim 21, wherein said moving magnet component comprises a permanent magnet.

23. The lens assembly of claim 22, wherein said lens guidance mechanism comprises one or more guide shafts fixedly coupled to said lens assembly housing; and one or more guide shaft mounting members fixedly coupled to said moving lens, each of said one or more guide shaft mounting members being movably received by one of said one or more guide shafts.

24. The lens assembly of claim 22, wherein said lens guidance mechanism comprises one or more guide shafts fixedly coupled to said moving lens; and one or more guide shaft mounting members fixedly coupled to said lens assembly housing, each of said one or more of said guide shaft mounting members being slidably received by one of said one or more guide shafts.

25. The lens assembly of claim 22, wherein said lens guidance mechanism comprises one or more ferromagnetic fluid bearings concentrically disposed in operative relationship between said lens assembly housing and said moving lens.

26. The lens assembly of claim 25, wherein at least one of said ferromagnetic fluid bearings comprises a pocket of ferromagnetic fluid positioned adjacent a magnetic field return path between said stationary coil component and said moving magnet components so as to contain the ferromagnetic fluid within said pocket.

27. The lens assembly of claim 22, wherein said lens assembly housing comprises a lens barrel concentrically disposed around said moving lens, and wherein said stationary coil component comprises a spirally wound conductor coil disposed adjacent the inner side of said lens barrel.

28. The lens assembly of claim 27, wherein said stationary coil component is thermally coupled to said inner side of said lens barrel; and wherein said lens barrel comprises a thermally conductive material.

29. The lens assembly of claim 27, wherein said moving magnet component comprises a magnetic tube concentrically disposed between said stationary coil component and said moving lens.

30. The lens assembly of claim 29, further comprising a lens container disposed within and coupled to said magnetic tube so that said lens container moves with said moving magnet component relative to said lens assembly housing, said lens container supporting said moving lens in a position centered about the longitudinal axis of said lens assembly.

31. The lens assembly of claim 22, wherein said damping mechanism comprises one or more spring members operatively coupled between said moving lens and stationary components of said lens assembly.

32. The lens assembly of claim 31, wherein said damping mechanism comprises a circular spring member coupled between said lens assembly housing and said moving lens.

33. The lens assembly of claim 22, wherein said damping mechanism comprises one or more ferromagnetic fluid bearings concentrically disposed in operative relationship between said lens assembly housing and said moving lens.

34. The lens assembly of claim 22, wherein said moving lens comprises a moving focus lens or a moving zoom lens.

35. The lens assembly of claim 22, wherein said lens assembly is configured to be positioned in a linear light path of an optical block.

36. The lens assembly of claim 35, wherein said optical block comprises a folded light path optical block.

37. The lens assembly of claim 35, wherein said optical block comprises a closed circuit television optical block.

38. An optical block assembly, comprising one or more actuatable lens assemblies operatively disposed in a linear light path of said optical block assembly, each of said one or more actuatable lens assemblies comprising:
a moving magnet component;
a stationary coil component; and
a moving lens component coupled to said moving magnet component;
wherein said stationary coil component is disposed around said moving lens component; and
wherein said actuatable lens assembly further comprises a damping mechanism coupled to said moving lens component.

39. The optical block assembly of claim 38, wherein said moving magnet component comprises a permanent magnet.

40. The optical block assembly of claim 39, wherein said one or more actuatable lens assemblies each comprise either a moving focus lens or a moving zoom lens.

41. The optical block assembly of claim 40, wherein said actuatable lens assembly further comprises a lens guidance mechanism coupled to said moving lens component, said lens guidance mechanism being configured to guide said moving lens component in a reciprocal linear path along the longitudinal axis of said linear light path of said optical block assembly.

42. The optical block assembly of claim 41, wherein said actuatable lens assembly further comprises one or more ferromagnetic fluid bearings.

43. The optical block assembly of claim 40, wherein said optical block assembly comprises at least two of said actuatable lens assemblies, a first one of said at least two actuatable lens assemblies comprising a moving focus lens, and a second one of said at least two actuatable lens assemblies comprising a moving zoom lens.

44. The optical block assembly of claim 43, wherein said optical block assembly comprises a folded light path optical block.

45. The optical block assembly of claim 44, wherein said optical block comprises a closed circuit television optical block.

46. The optical block assembly of claim 43, further comprising a computer control mechanism coupled to each of said first and second actuatable lens assemblies, said computer control mechanism configured to control movement of said moving focus lens of said first actuatable lens assembly in tandem with movement of said moving zoom lens of said second actuatable lens assembly such that the movement speed of said moving focus lens equals the movement speed of said moving zoom lens.

47. A method of moving a lens disposed within a lens assembly, comprising:
providing a lens assembly, said lens assembly comprising:
a moving magnet component,
a stationary coil component, and
a moving lens component coupled to said moving magnet component, said moving magnet component configured to move said moving lens component relative to said stationary coil component and said stationary coil component being disposed around said moving lens component; and
moving said moving lens component by generating current within said stationary coil component; and
further comprising damping movement of said moving lens component using a damping mechanism coupled to said moving lens component.

48. The method of claim 47, wherein said moving magnet component comprises a permanent magnet.

49. The method of claim 48, further comprising guiding movement of said moving lens component using a lens guidance mechanism coupled to said moving lens component.

50. The method of claim 48, wherein said moving lens component comprises a moving focus lens or a moving zoom lens.

51. The method of claim 48, wherein said lens assembly is positioned in a linear light path of an optical block.

52. The method of claim 51, wherein said optical block comprises a folded light path optical block.

53. The method of claim 51, wherein said optical block comprises a closed circuit television optical block.

54. The method of claim 51, further comprising controlling said movement of said moving lens component in tandem with controlling movement of a different moving lens component of a different lens assembly of said optical block such that the movement speed of said moving lens component equals the movement speed of said different moving lens component.

55. A lens assembly, comprising:
a moving magnet component;
a stationary coil component;
a moving lens component coupled to said moving magnet component, said moving magnet component configured to move said moving lens component relative to said stationary coil component; and
at least one of:
a lens guidance mechanism coupled to said moving lens component, said lens guidance mechanism comprising one or more ferromagnetic fluid bearings, or
a damping mechanism coupled to said moving lens component, said damping mechanism comprising one or more ferromagnetic fluid bearings, or
a combination thereof.

56. The lens assembly of claim 55, wherein said lens assembly comprises a lens guidance mechanism coupled to said moving lens component, and wherein said lens guidance mechanism comprises one or more ferromagnetic fluid bearings.

57. The lens assembly of claim 55, wherein said lens assembly comprises a damping mechanism coupled to said moving lens component, and wherein said damping mechanism comprises one or more ferromagnetic fluid bearings.

58. A lens assembly, comprising:
a moving magnet component;
a stationary coil component; and
a moving lens component coupled to said moving magnet component, said moving magnet component configured to move said moving lens component relative to said stationary coil component;
wherein said lens assembly is configured to be positioned in a linear light path of a folded light path optical block.

59. The lens assembly of claim 58, wherein said optical block comprises a closed circuit television optical block.

60. An actuatable lens assembly, comprising:
a voice coil motor assembly, said voice coil motor assembly comprising at least one stationary coil component and at least one moving magnet component;
a moving lens coupled to said at least one moving magnet component so that said moving lens moves with said moving magnet component relative to said stationary coil component; and
at least one of:
a lens guidance mechanism coupled to said moving lens, said lens guidance mechanism comprising one or more ferromagnetic fluid bearings, or
a damping mechanism coupled to said moving lens, said damping mechanism comprising one or more ferromagnetic fluid bearings, or
a combination thereof.

61. The lens assembly of claim 60, wherein said lens assembly comprises a lens guidance mechanism coupled to said moving lens, and wherein said lens guidance mechanism comprises one or more ferromagnetic fluid bearings.

62. The lens assembly of claim 60, wherein said lens assembly comprises a damping mechanism coupled to said moving lens, and wherein said damping mechanism comprises one or more ferromagnetic fluid bearings.

63. An actuatable lens assembly, comprising:
a voice coil motor assembly, said voice coil motor assembly comprising at least one stationary coil component and at least one moving magnet component; and
a moving lens coupled to said at least one moving magnet component so that said moving lens moves with said moving magnet component relative to said stationary coil component;
wherein said lens assembly is configured to be positioned in a linear light path of a folded light path optical block.

64. The lens assembly of claim 63, wherein said optical block comprises a closed circuit television optical block.

65. An optical block assembly, comprising one or more actuatable lens assemblies operatively disposed in a linear light path of said optical block, each of said one or more actuatable lens assemblies comprising:
a stationary coil component;
a moving magnet component movably coupled relative to said stationary coil component; and
a moving lens component coupled to said moving magnet component;
wherein said actuatable lens assembly further comprises one or more ferromagnetic fluid bearings coupled to said moving lens component.

66. An optical block assembly, comprising at least two actuatable lens assemblies operatively disposed in a linear light path of said optical block assembly, each of said actuatable lens assemblies comprising:
   a stationary coil component;
   a moving magnet component movably coupled relative to said stationary coil component; and
   a moving lens component coupled to said moving magnet component;
   wherein a first one of said at least two actuatable lens assemblies comprises a moving focus lens, and a second one of said at least two actuatable lens assemblies comprises a moving zoom lens.

67. The optical block assembly of claim 66, further comprising a computer control mechanism coupled to each of said first and second actuatable lens assemblies, said computer control mechanism configured to control movement of said moving focus lens of said first actuatable lens assembly in tandem with movement of said moving zoom lens of said second actuatable lens assembly such that the movement speed of said moving focus lens equals the movement speed of said moving zoom lens.

68. An optical block assembly, comprising one or more actuatable lens assemblies operatively disposed in a linear light path of said optical block assembly, each of said one or more actuatable lens assemblies comprising:
   a stationary coil component;
   a moving magnet component movably coupled relative to said stationary coil component; and
   a moving lens component coupled to said moving magnet component;
   wherein said optical block assembly comprises a folded light path optical block.

69. The optical block assembly of claim 68, wherein said optical block comprises a closed circuit television optical block.

70. A method of moving a lens disposed within a lens assembly, comprising:
   providing a lens assembly, said lens assembly comprising:
     a moving magnet component,
     a stationary coil component,
     a moving lens component coupled to said moving magnet component, said moving magnet component configured to move said moving lens component relative to said stationary coil component, and
     at least one of:
       a lens guidance mechanism coupled to said moving lens component, said lens guidance mechanism comprising one or more ferromagnetic fluid bearings, or
       a damping mechanism coupled to said moving lens component, said damping mechanism comprising one or more ferromagnetic fluid bearings, or
       a combination thereof; and
   moving said moving lens component by generating current within said stationary coil component.

71. The method of claim 70, wherein said lens assembly comprises a lens guidance mechanism coupled to said moving lens component, and wherein said lens guidance mechanism comprises one or more ferromagnetic fluid bearings.

72. The method of claim 71, wherein said lens assembly comprises a damping mechanism coupled to said moving lens component, and wherein said damping mechanism comprises one or more ferromagnetic fluid bearings.

73. A method of moving a lens disposed within a lens assembly, comprising:
   providing a lens assembly, said lens assembly comprising:
     a moving magnet component,
     a stationary coil component, and
     a moving lens component coupled to said moving magnet component, said moving magnet component configured to move said moving lens component relative to said stationary coil component; and
   moving said moving lens component by generating current within said stationary coil component;
   wherein said lens assembly is positioned in a linear light path of a folded light path optical block.

74. The method of claim 73, wherein said optical block comprises a closed circuit television optical block.

75. A method of moving a lens disposed within a lens assembly, comprising:
   providing a lens assembly, said lens assembly comprising:
     a moving magnet component,
     a stationary coil component, and
     a moving lens component coupled to said moving magnet component, said moving magnet component configured to move said moving lens component relative to said stationary coil component; and
   moving said moving lens component by generating current within said stationary coil component;
   wherein said lens assembly is positioned in a linear light path of an optical block; and
   wherein said method further comprises controlling said movement of said moving lens component in tandem with controlling movement of a different moving lens component of a different lens assembly of said optical block such that the movement speed of said moving lens component equals the movement speed of said different moving lens component.

76. A video lens assembly, comprising:
   a moving magnet component;
   a stationary coil component;
   a moving video lens component coupled to said moving magnet component, said moving magnet component configured to move said moving video lens component relative to said stationary coil component for focus or zoom operation; and
   a damping mechanism coupled to said moving video lens component and configured to dampen focus or zoom movement of said moving video lens component.

77. The lens assembly of claim 76, wherein said damping mechanism comprises one or more spring members.

78. The lens assembly of claim 76, wherein said damping mechanism comprises one or more ferromagnetic fluid bearings.

79. A method of moving a lens disposed within a video lens assembly, comprising:
   providing a video lens assembly, said video lens assembly comprising:
     a moving magnet component,
     a stationary coil component,
       a moving video lens component coupled to said moving magnet component, said moving magnet component configured to move said moving video lens component relative to said stationary coil component for focus or zoom operation, and
       a damping mechanism coupled to said moving video lens component and configured to dampen focus or zoom movement of said moving video lens component;
   moving said moving video lens component by generating current within said stationary coil component; and damping focus or zoom movement of said moving video lens component using a damping mechanism coupled to said moving video lens component.

80. The method of claim 79, wherein said damping mechanism comprises one or more spring members.

81. The method of claim 79, wherein said damping mechanism comprises one or more ferromagnetic fluid bearings.

82. A lens assembly, comprising:
a moving magnet component;
a stationary coil component; and
a moving lens component coupled to said moving magnet component, said moving magnet component configured to move said moving lens component relative to said stationary coil component;
wherein said stationary coil component is disposed around said moving lens component; and
further comprising a lens guidance mechanism coupled to said moving lens component;
wherein said lens guidance mechanism comprises one or more guide shaft mounting members movably received by one or more guide shafts.

83. A lens assembly, comprising:
a moving magnet component;
a stationary coil component; and
a moving lens component coupled to said moving magnet component, said moving magnet component configured to move said moving lens component relative to said stationary coil component;
wherein said stationary coil component is disposed around said moving lens component; and
further comprising a lens guidance mechanism coupled to said moving lens component;
wherein said lens guidance mechanism comprises one or more ferromagnetic fluid bearings.

84. A lens assembly, comprising:
a moving magnet component;
a stationary coil component; and
a moving lens component coupled to said moving magnet component, said moving magnet component configured to move said moving lens component relative to said stationary coil component;
wherein said stationary coil component is disposed around said moving lens component;
wherein said lens assembly is configured to be positioned in a linear light path of an optical block; and
wherein said optical block comprises a folded light path optical block.

85. The lens assembly of claim 84, wherein said optical block comprises a closed circuit television optical block.

86. An actuatable lens assembly, comprising:
a voice coil motor assembly, said voice coil motor assembly comprising at least one stationary coil component and at least one moving magnet component; and
a moving lens coupled to said at least one moving magnet component so that said moving lens moves with said moving magnet component relative to said stationary coil component;
wherein said stationary coil component is disposed around said moving lens; and
further comprising a lens assembly housing, said stationary coil component being fixedly coupled to said lens assembly housing;
wherein said lens assembly housing comprises a lens barrel concentrically disposed around said moving lens, and wherein said stationary coil component comprises a spirally wound conductor coil disposed adjacent the inner side of said lens barrel; and
wherein said stationary coil component is thermally coupled to said inner side of said lens barrel; and wherein said lens barrel comprises a thermally conductive material.

87. An actuatable lens assembly, comprising:
a voice coil motor assembly, said voice coil motor assembly comprising at least one stationary coil component and at least one moving magnet component; and
a moving lens coupled to said at least one moving magnet component so that said moving lens moves with said moving magnet component relative to said stationary coil component;
wherein said stationary coil component is disposed around said moving lens;
wherein said lens assembly is configured to be positioned in a linear light path of an optical block; and
wherein said optical block comprises a folded light path optical block.

88. An actuatable lens assembly, comprising:
a voice coil motor assembly, said voice coil motor assembly comprising at least one stationary coil component and at least one moving magnet component; and
a moving lens coupled to said at least one moving magnet component so that said moving lens moves with said moving magnet component relative to said stationary coil component;
wherein said stationary coil component is disposed around said moving lens;
wherein said lens assembly is configured to be positioned in a linear light path of an optical block; and
wherein said optical block comprises a closed circuit television optical block.

89. An optical block assembly, comprising one or more actuatable lens assemblies operatively disposed in a linear light path of said optical block assembly, each of said one or more actuatable lens assemblies comprising:
a moving magnet component;
a stationary coil component; and
a moving lens component coupled to said moving magnet component;
wherein said stationary coil component is disposed around said moving lens component;
wherein said actuatable lens assembly further comprises one or more ferromagnetic fluid bearings.

90. An optical block assembly, comprising at least two actuatable lens assemblies operatively disposed in a linear light path of said optical block assembly, each of said actuatable lens assemblies comprising:
a stationary coil component; and
a moving magnet component movably coupled relative to said stationary coil component; and
a moving lens component coupled to said moving magnet component;
wherein said stationary coil component is disposed around said moving lens component;
wherein a first one of said at least two actuatable lens assemblies comprises a moving focus lens, and a second one of said at least two actuatable lens assemblies comprises a moving zoom lens.

91. The optical block assembly of claim 90, wherein said optical block assembly comprises a folded light path optical block.

92. The optical block assembly of claim 91, wherein said optical block comprises a closed circuit television optical block.

93. The optical block assembly of claim 90, further comprising a computer control mechanism coupled to each of said first and second actuatable lens assemblies, said computer control mechanism configured to control movement of said moving focus lens of said first actuatable lens assembly in tandem with movement of said moving zoom lens of said second actuatable lens assembly such that the movement speed of said moving focus lens equals the movement speed of said moving zoom lens.

94. A method of moving a lens disposed within a lens assembly, comprising:
    providing a lens assembly, said lens assembly comprising:
        a moving magnet component,
        a stationary coil component, and
        a moving lens component coupled to said moving magnet component, said moving magnet component configured to move said moving lens component relative to said stationary coil component and said stationary coil component being disposed around said moving lens component; and
    moving said moving lens component by generating current within said stationary coil component;
    wherein said lens assembly is positioned in a linear light path of an optical block; and
    wherein said optical block comprises a folded light path optical block.

95. A method of moving a lens disposed within a lens assembly, comprising:
    providing a lens assembly, said lens assembly comprising:
        a moving magnet component,
        a stationary coil component, and
        a moving lens component coupled to said moving magnet component, said moving magnet component configured to move said moving lens component relative to said stationary coil component and said stationary coil component being disposed around said moving lens component; and
    moving said moving lens component by generating current within said stationary coil component;
    wherein said lens assembly is positioned in a linear light path of an optical block; and
    wherein said optical block comprises a closed circuit television optical block.

96. A method of moving a lens disposed within a lens assembly, comprising:
    providing a lens assembly, said lens assembly comprising:
        a moving magnet component,
        a stationary coil component, and
        a moving lens component coupled to said moving magnet component, said moving magnet component configured to move said moving lens component relative to said stationary coil component and said stationary coil component being disposed around said moving lens components
        wherein said lens assembly is positioned in a linear light path of an optical block; and
    moving said moving lens component by generating current within said stationary coil component; and
    further comprising controlling said movement of said moving lens component in tandem with controlling movement of a different moving lens component of a different lens assembly of said optical block such that the movement speed of said moving lens component equals the movement speed of said different moving lens component.

* * * * *